(12) United States Patent
McClean et al.

(10) Patent No.: US 12,481,258 B2
(45) Date of Patent: Nov. 25, 2025

(54) KITCHEN DEVICE HAVING A MAGNETOMETER

(71) Applicant: Breville Pty Limited, Alexandria (AU)

(72) Inventors: Stephen John McClean, Alexandria (AU); Eddie Siu, Alexandria (AU); Garth Ryan, Alexandria (AU); Duncan Bruce Hellmers, Alexandria (AU); Johnson Thie, Alexandria (AU); Richard Lehonde Hoare, Alexandria (AU)

(73) Assignee: BREVILLE PTY LIMITED, Nsw (AU)

( * ) Notice: Subject to any disclaimer, the term of this patent is extended or adjusted under 35 U.S.C. 154(b) by 428 days.

(21) Appl. No.: 18/011,898

(22) PCT Filed: Jun. 10, 2021

(86) PCT No.: PCT/AU2021/050587
§ 371 (c)(1),
(2) Date: Dec. 21, 2022

(87) PCT Pub. No.: WO2022/000022
PCT Pub. Date: Jan. 6, 2022

(65) Prior Publication Data
US 2023/0240477 A1  Aug. 3, 2023

(30) Foreign Application Priority Data
Jun. 29, 2020 (AU) .................................. 2020902173

(51) Int. Cl.
*G05B 19/02* (2006.01)
*A47J 43/07* (2006.01)

(52) U.S. Cl.
CPC .......... *G05B 19/02* (2013.01); *A47J 43/0722* (2013.01); *A47J 43/0761* (2013.01)

(58) Field of Classification Search
CPC ..... G05B 19/02; A47J 43/046; A47J 43/0722; A47J 43/0761; A47J 43/06; A47J 31/44;
(Continued)

(56) References Cited

U.S. PATENT DOCUMENTS

| 4,371,118 A | * | 2/1983 | Sontheimer | ............... F16P 3/10 |
| | | | | 241/37.5 |
| 4,854,717 A | * | 8/1989 | Crane | ..................... B01F 27/61 |
| | | | | 366/197 |

(Continued)

FOREIGN PATENT DOCUMENTS

WO  2020112312 A2  6/2020

OTHER PUBLICATIONS

EESR issued in EP patent application No. 21833541.2, dated May 14, 2024, 6 pages.

(Continued)

*Primary Examiner* — Chun Cao
(74) *Attorney, Agent, or Firm* — Tarolli, Sundheim, Covell & Tummino LLP (57) ABSTRACT

A kitchen device (100) having: a base (110) with a coupling (120) for receiving an accessory (130), the accessory (130) comprising a magnet and being configured for performing an operation when operated by the kitchen device (100); a controller configured to operate the kitchen device (100), and thereby the accessory (130), to perform the operation; and a magnetometer located in the base (110) and configured to interact with the magnet when the accessory (130) is coupled to the base (110) to provide an accessory signal indicative of a presence of the accessory (130) to the controller, wherein the magnetometer comprises a magnetoresistor.

14 Claims, 6 Drawing Sheets

(58) Field of Classification Search
CPC . A47J 44/00; G01V 3/081; H01F 7/02; G01R 33/0029; G01R 33/0035; G01R 33/072; G01R 33/091
USPC .......................................................... 700/28
See application file for complete search history.

(56) References Cited

U.S. PATENT DOCUMENTS

| | | | |
|---|---|---|---|
| 7,798,373 | B1 | 9/2010 | Wroblewski |
| 9,354,084 | B2 | 5/2016 | Ausserlechner et al. |
| 9,759,578 | B2* | 9/2017 | Haeberle .................. G01B 7/14 |
| 10,111,558 | B2 | 10/2018 | Dickson, Jr. et al. |
| 2003/0066431 | A1 | 4/2003 | Fanzutti |
| 2005/0288576 | A1 | 12/2005 | Fegert et al. |
| 2009/0084274 | A1 | 4/2009 | Kovacic et al. |
| 2015/0137797 | A1* | 5/2015 | Ausserlechner ......... G01D 3/08 |
| | | | 324/207.13 |
| 2016/0256006 | A1 | 9/2016 | Dickson, Jr. et al. |
| 2016/0256007 | A1* | 9/2016 | Dickson, Jr. ........ B01F 27/1126 |
| 2019/0365277 | A1 | 12/2019 | Brister et al. |
| 2020/0069110 | A1 | 3/2020 | Wang et al. |

OTHER PUBLICATIONS

International Search Report and Written Opinion issued in connection with corresponding PCT Patent Application No. PCT/AU2021/050587 dated Aug. 31, 2021.

* cited by examiner

KITCHEN DEVICE HAVING A MAGNETOMETER

RELATED APPLICATIONS

The present invention is a U.S. National Stage under 35 USC 371 patent application, claiming priority to PCT Application No. PCT/AU2021/050587, filed on Jun. 10, 2021, which claims priority from Australian Patent Application No. 2020902173 filed on Jun. 29, 2020; the entireties of both are hereby incorporated herein by reference.

FIELD

The present invention relates to a kitchen device having a magnetometer.

BACKGROUND

Motor-operated kitchen devices frequently have safety features to detect the presence of an accessory, or to identify an accessory. For example, in some products interlocks are located on a handle attached to the lid, or on the perimeter of a lid to detect that the lid is located on the vessel. These types of designs often require many parts, as well as moving parts, causing additional manufacturing costs and product failures during use, creating a safety risk.

In addition to simplifying the design and manufacture of these safety features, it would be desirable to control the kitchen device according to different control schemes, depending on the type of accessory connected to the kitchen device.

SUMMARY OF INVENTION

It is an object of the present invention to address or overcome one or more of the above disadvantages, or at least provide a useful alternative to the above-mentioned kitchen devices.

In a first aspect, the present invention provides a kitchen device having:
  a base with a coupling for receiving an accessory, the accessory comprising a magnet and being configured for performing an operation when operated by the kitchen device;
  a controller configured to operate the kitchen device, and thereby the accessory, to perform the operation; and
  a magnetometer located in the base and configured to interact with the magnet when the accessory is coupled to the base to provide an accessory signal indicative of a presence of the accessory to the controller,
  wherein the magnetometer comprises a magnetoresistor.

Preferably, the controller operates the kitchen device according to a predetermined set of instructions or within a predetermined set of operational limitations, and
  wherein the predetermined set of instructions and predetermined set of operational limitations are selected by the controller based on the accessory signal.

Preferably, the magnetoresistor includes a first sensor element being aligned with a first sensor axis that intersects the magnetoresistor,
  wherein the accessory signal includes a first component for the first sensor axis, the first component being indicative of a magnetic field strength in the direction of the first sensor axis, and
  wherein the controller is configured to interpret an accessory signal indicative of a magnetic field strength within a predetermined range in a predetermined direction as being indicative of a presence of the accessory.

Preferably, the magnetoresistor includes a second sensor element being aligned with a second sensor axis that intersects the magnetoresistor, the second sensor axis being non-parallel to the first sensor axis, and
  wherein the accessory signal includes a second component for the second sensor axis, the second component being indicative of a magnetic field strength in the direction of the second sensor axis.

Preferably, the magnetoresistor includes a third sensor element being aligned with a third sensor axis that intersects the magnetoresistor, the third sensor axis being non-parallel to the first and second sensor axes, and
  wherein the accessory signal includes a third component for the third sensor axis, the third component being indicative of a magnetic field strength in the direction of the second third axis.

Preferably, the first sensor axis is a radial axis indicating a distance from a reference point in a first plane, the second sensor axis is a circumferential axis in the first plane indicating an angle from a reference direction, and the third sensor axis is a second circumferential axis in a second plane indicating a second angle from a second reference direction.

Preferably, the first sensor axis is a radial axis indicating a distance from a reference point in a first plane, the second sensor axis is a circumferential axis in the first plane indicating an angle from a reference direction, and the third sensor axis is an axis indicating a distance from the reference point in a second plane,
  wherein the second plane is normal to the first plane.

Preferably, the controller is configured to transpose the accessory signal to provide a transposed signal such that a magnitude of the accessory signal is substantially zero or close to zero by a margin of at most 10 times of a RMS noise level of the magnetoresistor when the accessory is coupled to the base.

Preferably, the accessory is a first accessory or a second accessory, the first and second accessory having a first and second magnet at a first and second magnet location, respectively, and
  wherein the first and second magnet have different magnetic moments and/or the first and second magnet locations relative to the magnetoresistor are different when the accessory is received in the coupling such that the accessory signal provided by the magnetoresistive sensor when the first accessory is received by the coupling is different to the accessory signal provided by the magnetoresistor when the second accessory is received by the coupling.

Preferably, the coupling is for receiving an intermediate accessory, the intermediate accessory having a second coupling for receiving the accessory.

Preferably, the magnetometer has three or more sensor elements, at least one sensor element being aligned with a respective orthogonal axis for providing an accessory signal including a component for a respective orthogonal axis, each component being indicative of a magnetic field strength in the direction of the respective orthogonal axis; and
  the controller is configured to transform the components of the accessory signal to provide a transformed signal, the transformed signal including a component for a respective transformed sensor axis, each component being indicative of a magnetic field strength in the direction of the respective transformed sensor axis, such that the transformed sensor axes intersect at an expected position of the magnet when the accessory is used with the kitchen device, the controller being further configured to determine a distance of the magnet from the expected position based on the transformed signal and calibration data, such that the controller operates the kitchen device in response to the distance of the magnet from the expected position being within a predetermined tolerance.

Preferably, the controller is configured to operate the kitchen device according to a predetermined set of instructions or within a predetermined set of operational limitations, the predetermined set of instructions and the set of predetermined set of operational limitations being selected by the controller based on the transformed signal.

In a second aspect, the present invention provides a combination of a kitchen device and an accessory to be used with the kitchen device, the kitchen device having:
  a base;
  a controller for operating the kitchen device; and
  a magnetometer for providing an accessory signal to the controller when interacting with a magnet, the magnetometer including at least one sensor element, each sensor element being aligned with a respective non-parallel sensor axis,
  wherein the accessory signal includes a component for each sensor axis, each component being indicative of a magnetic field strength in the direction of the respective non-parallel axis, and
the accessory having:
  a magnet configured to move from a first position to a second position during use of the accessory with the kitchen device.

Preferably, the magnetometer includes three or more sensor elements.

Preferably, the controller causes a change in an operational setting of the kitchen device if the accessory signal indicates that the magnet is in the second position.

Preferably, the magnetometer is a magnetoresistor.

A third aspect of the present invention provides a method for operating a combination of a kitchen device and an accessory, the kitchen device having:
  a controller for operating the kitchen device; and
  a magnetometer including three or more sensor elements, at least one sensor element being aligned with a respective orthogonal axis for providing an accessory signal including a component for a respective orthogonal axis, each component being indicative of a magnetic field strength in the direction of the respective orthogonal axis,
the accessory having a magnet, the method including the steps of:
  receiving, at the controller, the accessory signal;
  transforming, at the controller, the components of the accessory signal to provide a transformed signal, the transformed signal including a component for a respective transformed sensor axis, each component being indicative of a magnetic field strength in the direction of the respective transformed sensor axis, and wherein the transformed sensor axes intersect at an expected position of the magnet when the accessory is used with the kitchen device;
  determining, at the controller, based on the transformed signal and calibration data, a distance of the magnet from the expected position;
  when the distance of the magnet from the expected position is within a predetermined tolerance, operating, using the controller, the kitchen device.

Preferably, the step of operating the kitchen device includes operating the kitchen device according to a predetermined set of instructions or within a predetermined set of operational limitations, wherein the predetermined set of instructions and the set of predetermined set of operational limitations are selected by the controller based on the transformed signal.

BRIEF DESCRIPTION OF DRAWINGS

Preferred embodiments of the present invention will now be described, by way of examples only, with reference to the accompanying drawings.

DESCRIPTION OF EMBODIMENTS

Where reference is made in any one or more of the accompanying drawings to steps and/or features, which have the same reference numerals, those steps and/or features have for the purposes of this description the same function(s) or operation(s), unless the contrary intention appears.

It is to be noted that the discussions contained in the "Background" section and that above relating to prior art arrangements relate to discussions of documents or devices which form public knowledge through their respective publication and/or use. Such should not be interpreted as a representation by the present inventor(s) or the patent applicant that such documents or devices in any way form part of the common general knowledge in the art.

Figure 1:
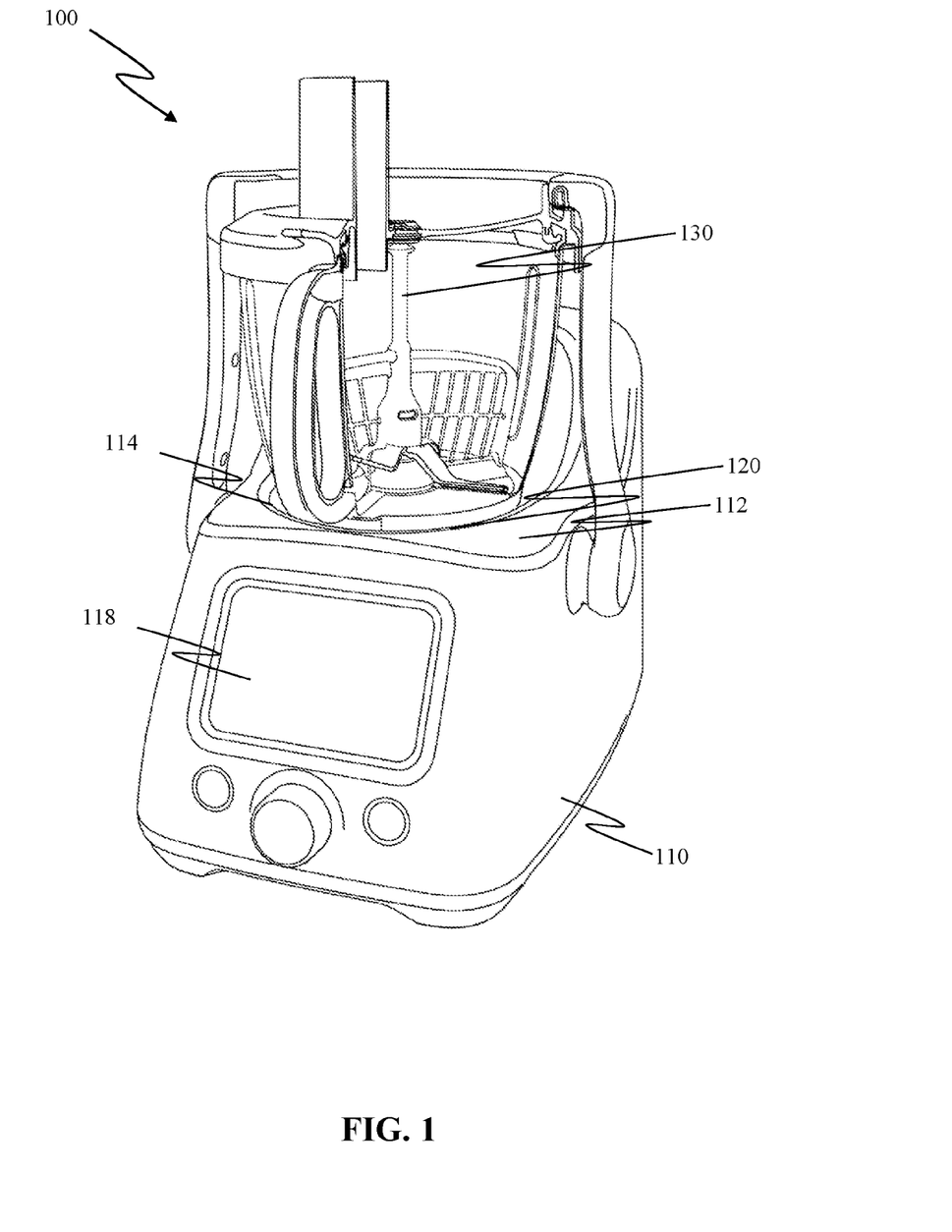
FIG. 1 shows a front isometric cut-away view of a kitchen device according to a preferred embodiment of the invention.

As seen in FIG. 1, a kitchen device 100 according to a preferred embodiment of the invention includes a base 110. The base 110, at an upper surface 112, includes an opening 114 having a coupling 120 for receiving an accessory 130. The base 110 also has a second, upright, portion 116 that extends above the upper surface 112 at one side of the opening 114. At an opposing side of the opening 114, the base 110 has a user interface 118.

The kitchen device 100 further includes a controller 150 mounted within the base 110, the controller 150 being configured to operate the kitchen device 100 according to a predetermined set of instructions and/or according to user input received from the user interface 118.

Figure 4:
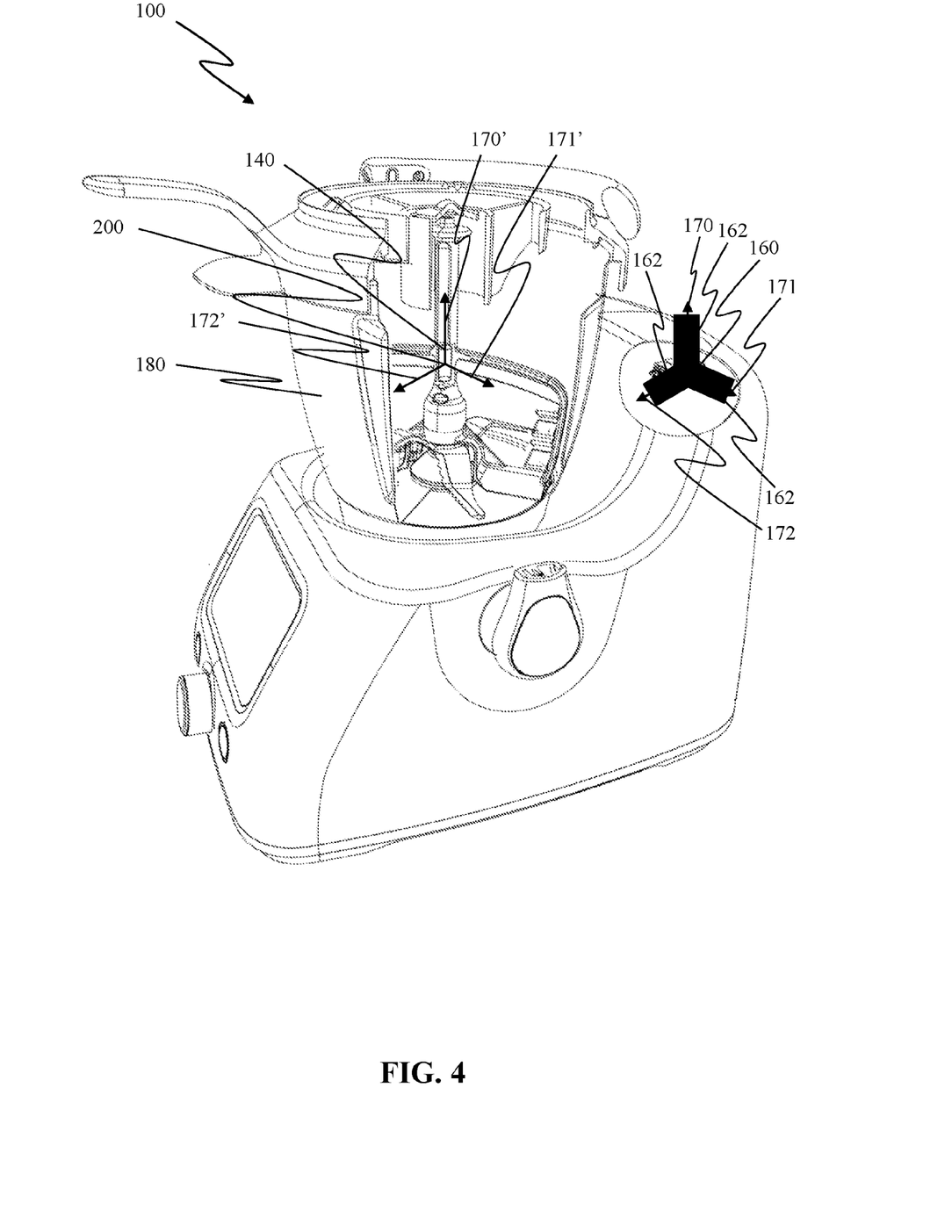
FIG. 4 shows a right-side isometric cut-away view of the kitchen device of FIG. 1.

Referring briefly to FIG. 4, the kitchen device 100 also includes a magnetometer, preferably a magnetoresistor 160, in the upright portion 116. More preferably, the magnetoresistor 160 is a three-axis magnetoresistor 160 having three sensor elements 162, each sensor element being aligned with one of a first, second, or third non-parallel axis 170, 171, 172 that intersect at the location of the magnetoresistor 160 and thereby being indicative of a magnetic field strength in the direction of the respective non-parallel axis 170, 171, 172.

The magnetoresistor 160 provides an accessory signal to the controller 150, the accessory signal 150 including a component for each sensor element 162, and therefore an indication of the magnetic field strength in the direction of the non-parallel axes 170, 171, 172, the non-parallel axes 170, 171, 172 intersecting at the location of the magnetoresistor 160.

Figure 2:
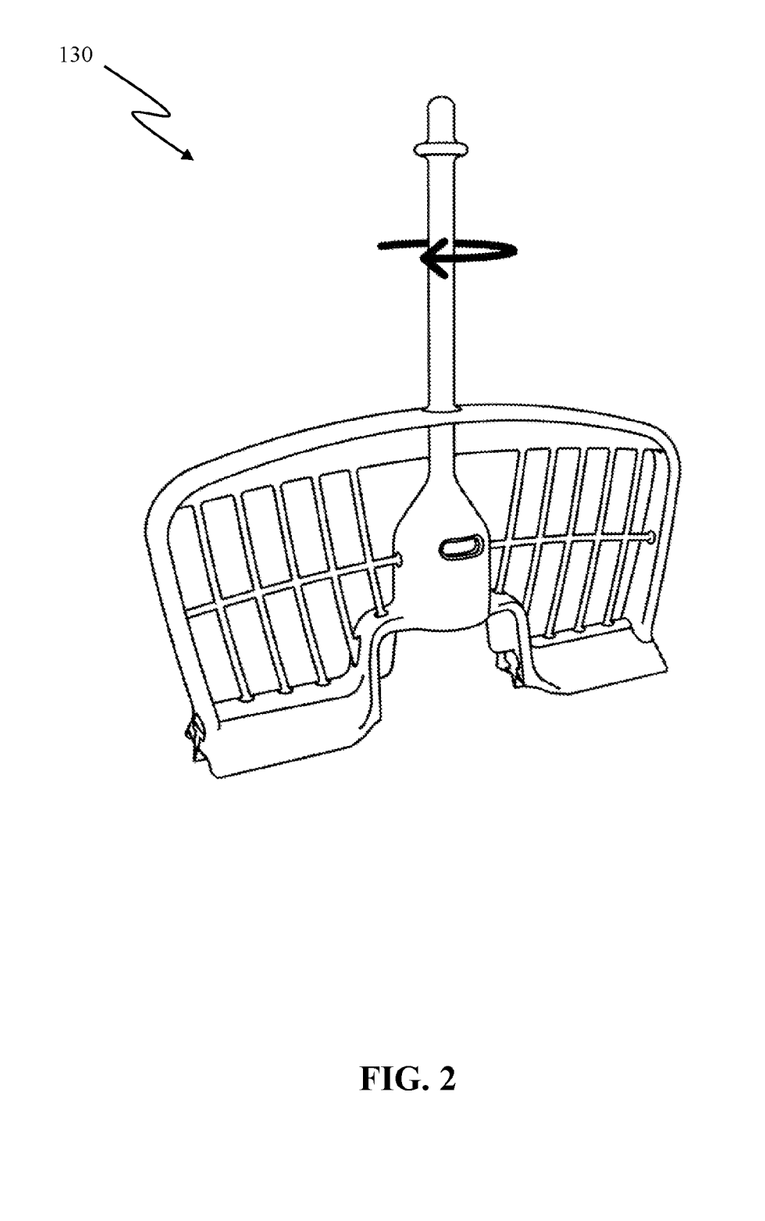
FIG. 2 shows an isometric view of an accessory to be used with the kitchen device of FIG. 1.

Referring back to FIG. 1, the kitchen device 100 may receive, at the coupling 120, an accessory 130. An example of an accessory 130 is shown in FIG. 2, being a whisk. The accessory 130 is configured to perform an operation when operated by the kitchen device 100, in the present example of the whisk, the operation is whisking. In another example, the accessory 130 may be a milk jug (not shown), the kitchen device 100 may be an espresso machine, and the operation is the steaming of milk. The controller 150 is configured to execute a set of executable instructions to operate the kitchen device 100, and thereby the accessory 130, to perform the desired operation.

Figure 3:
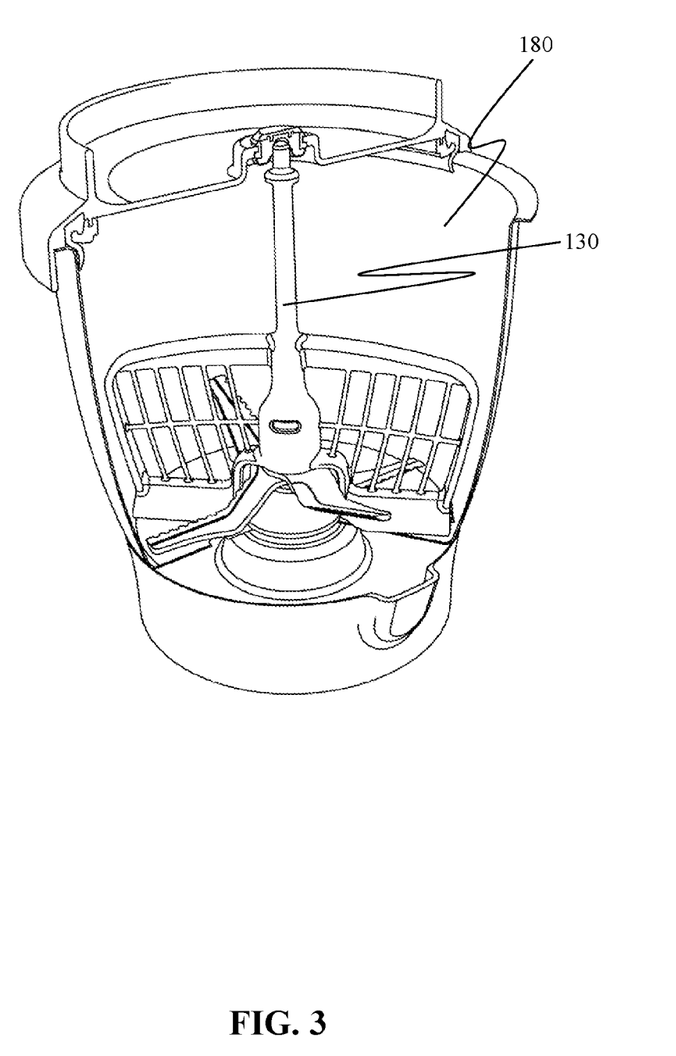
FIG. 3 shows an isometric cut-away view of an intermediate accessory to be used with the kitchen device of FIG. 1.

Referring to FIG. 3, the kitchen device 100 may instead receive an intermediate accessory 180 at the coupling 120. The intermediate accessory 180 has a second coupling 182 for receiving the accessory 130. In the preferred embodiment, the intermediate accessory 180 is a vessel, the second coupling 182 is a drive shaft, and the accessory 130 is a whisk mounted on the drive shaft.

Use of the kitchen device 100 will now be discussed.

To use the accessory 130 with the kitchen device 100 to perform an operation, the intermediate accessory 180 is mounted on the base 110 using the coupling 120. The accessory 130 is then mounted on the intermediate accessory 180 using the second coupling 182.

Figure 5:
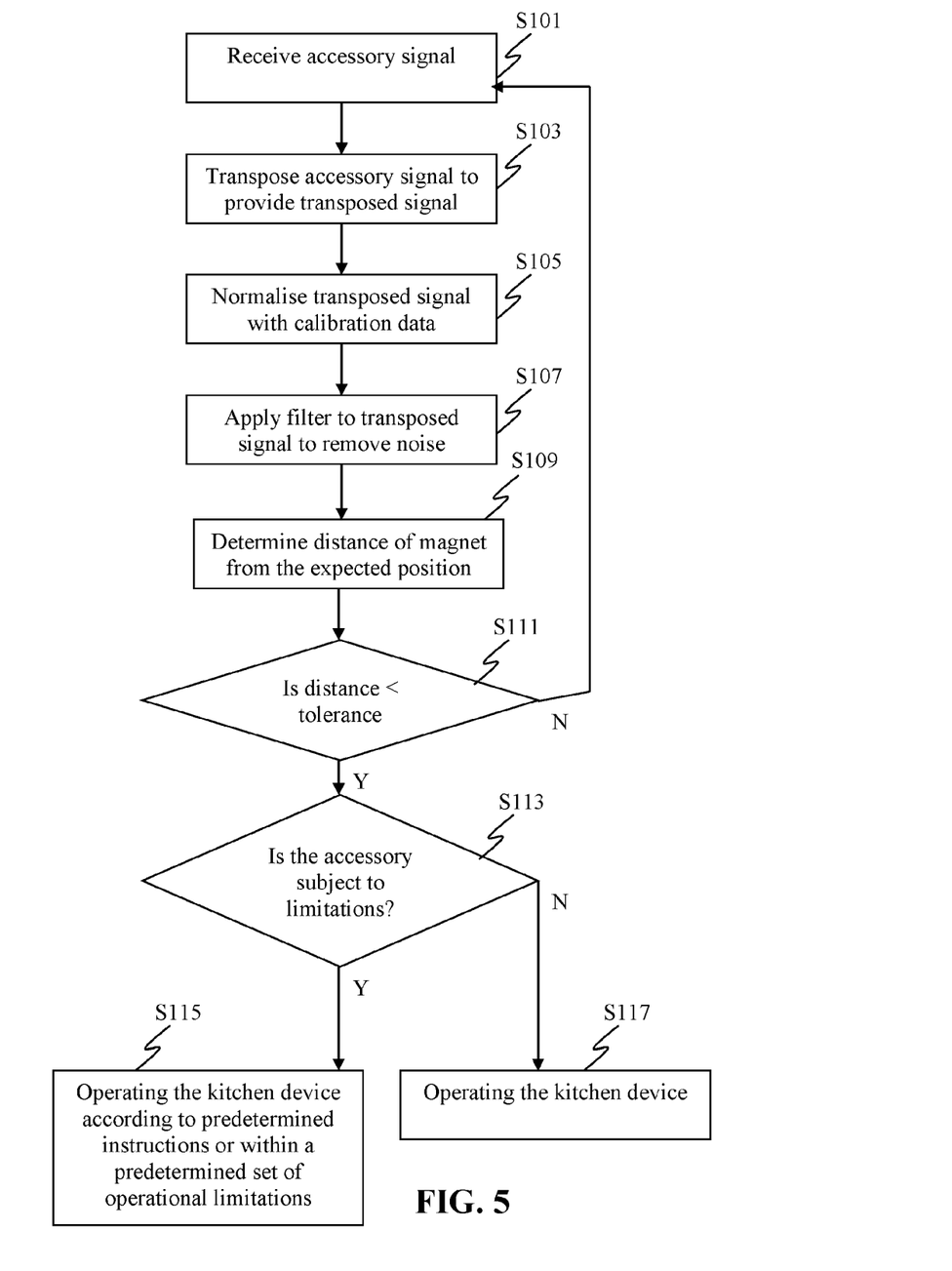
FIG. 5 is a flow chart of a method for operating the kitchen device of FIG. 1.

When receiving electrical power, the magnetoresistor 160 provides the accessory signal to the controller 150. As shown in FIG. 5, the controller 150, at step S101, receives the accessory signal. The components of the accessory signal received by the controller 150 are indicative of a magnetic field strength in the direction of the non-parallel axes 170, 171, 172 that intersect at the location of the magnetoresistor 160.

At step S103, the controller 150 transforms the accessory signal to provide a transformed signal. The transformed signal includes a component indicative of the magnetic field strength in the direction of transformed non-parallel axes 170', 171', 172', wherein the transformed non-parallel axes intersect at an expected position 200 of the magnet, when the accessory 130 is coupled to the kitchen device 100. The transformed signal may further be normalised, at step S105, using predetermined calibration data, such that a magnitude of the transformed signal is substantially zero, or close to zero by a margin of at most 10 times of a RMS noise level of the magnetoresistor, when the accessory 130 is coupled to the kitchen device 100. The predetermined calibration data may be obtained by the controller 150 by performing a calibration measurement when the accessory 130 is coupled to the kitchen device 100, and retained for future operations.

If three or more sensor elements 162 are used, the accessory signal and/or transformed signal can be represented in many ways. In one embodiment, the vector may be written in cartesian coordinates; in a second embodiment spherical coordinates are used; in a third embodiment cylindrical coordinates are used.

In the second embodiment the first sensor axis is a radial axis indicating a distance from a reference point in a first plane, the second sensor axis is a circumferential axis in the first plane indicating an angle from a reference direction, and the third sensor axis is a second circumferential axis in a second plane indicating a second angle from a second reference direction.

In the third embodiment the first sensor axis is a radial axis indicating a distance from a reference point in a first plane, the second sensor axis is a circumferential axis in the first plane indicating an angle from a reference direction, and the third sensor axis is an axis indicating a distance from the reference point in a second plane, wherein the second plane is normal to the first plane.

It is now possible, having obtained a transformed, and preferably normalised, signal, to apply, by the controller 150 at step S107, an exponential smoothing filter, an infinite impulse response filter, and/or a Kalman filter to remove undesirable noise from the transformedsignal. Further, the controller 150 may apply a principal component analysis to the transformedsignal to maximise variation in a principal direction.

The controller 150 now, at step S109, determines a distance (not shown) of the magnet 140 from the expected position 200. The distance may be indicative of the physical distance, or a measure of how far the transformedsignal is from being within a predetermined tolerance of a quantity indicating that the magnet 140 is located at the expected position 200. Once the distance has been determined the controller 150, at step S111, the controller 150 determines whether the distance is within a predetermined tolerance of the expected position 200. To assist the determination, the controller 150 may weigh the distance from the expected position 200 using a p-norm such as:

$$C_1|X_1|^p + C_2|X_2|^p + \ldots + C_k|X_k|^p - \text{threshold}^p \text{ for } p=1,2,\ldots n$$

If the controller 150 has determined that the distance is within the predetermined tolerance, the controller 150, at step S113, determines whether the accessory 130 is subject to operational limitations, or is associated with a predetermined set of instructions. The controller 150 makes this determination on the basis of the accessory and/or transformedsignal, which is indicative of a magnetic moment of the magnet 140 and/or the position of the magnet 140 relative to the expected position 200. The magnetic moment is a vector including both a direction and a magnitude. Different accessories 130 may have different expected positions 200, such that the controller 150 performs the determination of step S113 by determining at which expected position 200 the magnet 140 is located. In short, a first accessory 130 may have a first magnet 140, and a second accessory 130a may have a second magnet 140a. The first and second magnets 140, 140a may have different magnetic moments and/or the expected positions 200, 200a of the first and second accessories 130, 130a are different relative to the magnetometer 160, such that the accessory signals received by the magnetometer 160 are different for the first and second accessories 130, 130a.

If the accessory 130 is subject to limitations, the controller 150, at step S115, operates the kitchen device 100 according to the predetermined set of instructions or within a predetermined set of operational limitations. The predetermined set of instructions and the predetermined set of operational limitations are selected by the controller 150 based on the accessory and/or transformedsignal. If the accessory 130 is not subject to limitations, the controller 150 operates the kitchen device 100 in accordance with input from the user interface 118.

During operation of the kitchen device 100, for example if the accessory 130 rotates during operation and the magnet 140 is not co-linear with the axis of rotation, the transformedsignal will form a periodic signal about zero. If the accessory signal is not transformed, the accessory signal will form a periodic signal about a value corresponding to the expected position 200. The controller 150 may determine from the frequency and/or form of the periodic transformed-signal the operating speed of a motor (not shown) of the kitchen device and/or differentiate between the first and second accessory 130, 130a.

Figure 6:
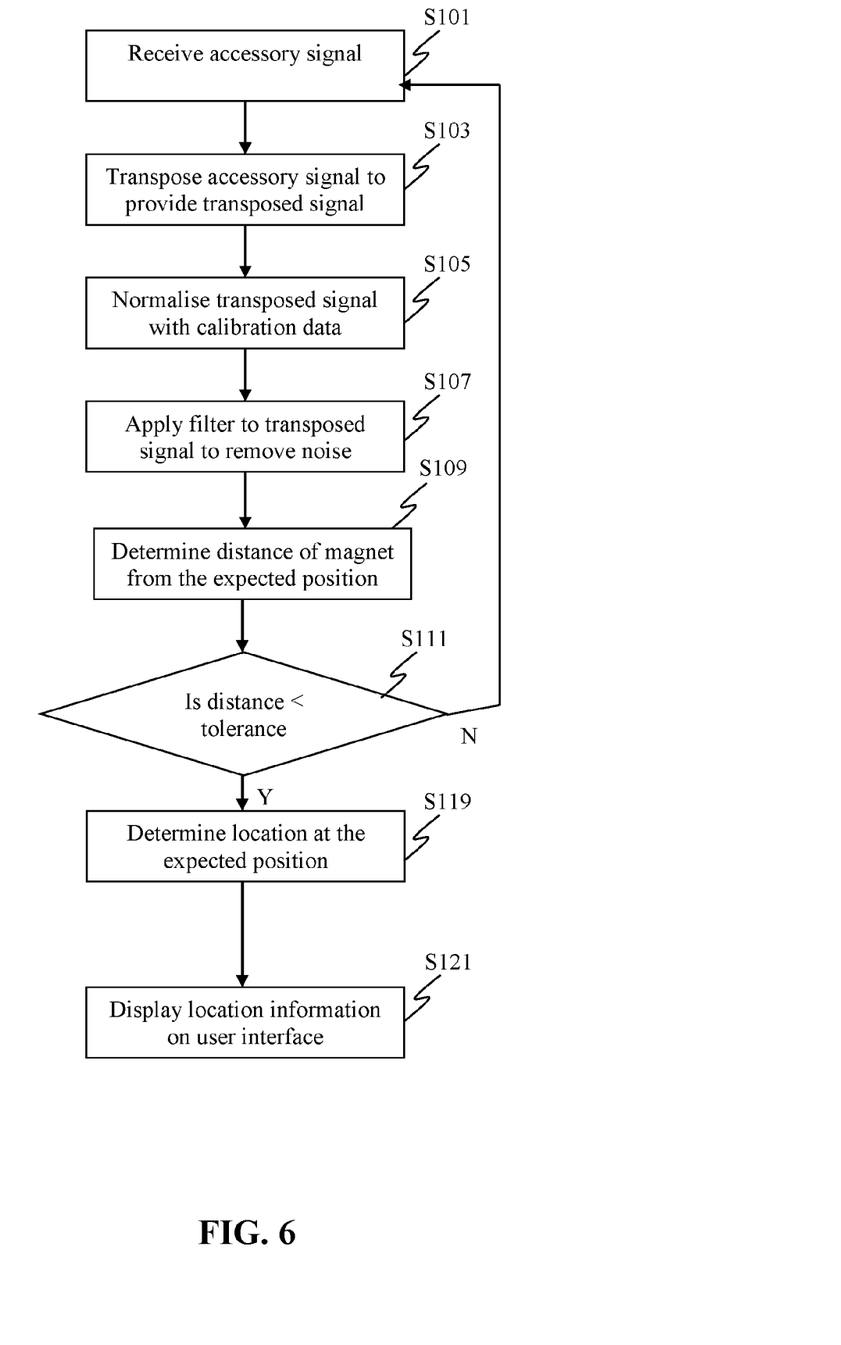
FIG. 6 is a flow chart of a second embodiment of a method for operating the kitchen device of FIG. 1.

In a second embodiment, shown in FIG. 6, the expected position 200 may be a range of locations, for example located along a linear path. In response to determining, at step S111, that the magnet 140 is at the expected position 200, the controller 150 now, at step S119, determines the location of the magnet 140 at the expected position 200 using calibration data. The calibration data used by the controller 150 at step S119 is predetermined. At step 121, the controller 150 displays information related to the location of the magnet 140 at the expected position 200. For example, the accessory 130 may be a floater in a water tank of a kitchen device 100, for example an espresso machine, that moves along a linear vertical path as the water level of the water tank varies. The floater includes the magnet 140. Therefore, the magnet 140 is configured to move from a first position to a second position during use of the accessory 130 with the kitchen device 100.

Advantages of the kitchen device 100 will now be discussed.

Because the magnetometer 160 is a magnetoresistor, the accessory 130 may be equipped with an unpowered device, e.g. the magnet 140. This greatly simplifies the design of accessories. Further, because the magnetometer 160 is a magnetoresistor, it is sensitive at much greater distances compared to, for example, hall effect sensors which require very close contact with the magnet 140 and are usually used for more precise, but close, measurements. The sensitivity of the magnetoresistor at greater distances, and the ability to detect magnetic fields through obstructing surfaces such as a stainless steel bowl, allows the magnet 140 to be located at an almost arbitrary position on the accessory, simplifying the design requirements and lowering production costs.

The determination of whether the accessory 130 is the first or second accessory 130, 130a, and operating the kitchen device 100 according to the predetermined set of instructions, or within the predetermined set of operational limitations, allows a single kitchen device 100 to be safely operated with a multitude of accessories 130, 130a, while maintaining simple design requirements for the kitchen device 100 and the accessories 130, 130a.

The use of a three-axis magnetoresistor allows the magnetoresistor 160 to determine, on the basis of direction of the magnetic field, and its strength, a position of the magnet 140 relative to the magnetoresistor 160.

Transforming the accessory signal to provide a transformed signal allows a more accurate determination of whether the magnet 140 is at the expected position 200. If the magnet 140 is much closer to the expected position 200 than to the magnetometer 160, it is desirable and more effective for tolerancing to perform the filtering of the transformed signal referred from the expected position 200, rather than to perform filtering of the accessory signal referred from position of the magnetometer 160.

The use of magnets 140 with different magnetic moments and/or magnet locations on the accessory 130 in relation to the expected position 200 allows the controller 150 to differentiate between accessories 130, 130a being used for different operations.

The use of an intermediate accessory 180 allows a larger variety of accessories 130 to be used with the kitchen device 100.

The location of the magnetometer 160 in the upright portion 116 of the base 110 places the magnetometer 160 at one end of an approximately equilateral triangle, the opposing side being formed by an expected travel path of the whisk as it is mounted on the shaft. This arrangement places the magnetometer approximately equidistally from the expected travel path, allowing more consistent and more precise determinations of the location of the magnet 140 relative to the expected position 200.

Determining the location of the magnet 140 relative to an expected position 200 that is a zone, or a path, allows the controller 150 to determine an operational parameter of the accessory, for example a fill level of a water tank, and display information relating to the operational parameter on the user interface 118, increasing the capability of the kitchen device 100 to obtain and present information to the user.

The advantageous embodiments and/or further developments of the above disclosure—except for example in cases of clear dependencies or inconsistent alternatives—can be applied individually or also in arbitrary combinations with one another.

LIST OF FEATURES 100 kitchen device
110 base
112 upper surface
114 opening
116 upright portion
118 user interface
120 coupling
130 accessory
140 magnet
150 controller
160 magnetometer
170 first orthogonal axis
171 second orthogonal axis
172 third orthogonal axis
180 intermediate accessory
182 second coupling
200 expected position

The invention claimed is:

1. A kitchen device having:
a base with a coupling for receiving an accessory, the accessory comprising a magnet and being configured for performing an operation when operated by the kitchen device;
a controller configured to operate the kitchen device, and thereby the accessory, to perform the operation; and
a magnetometer located in the base and configured to interact with the magnet when the accessory is coupled to the base to provide an accessory signal indicative of a presence of the accessory to the controller,
wherein the magnetometer includes three or more sensor elements, each sensor element comprising a magnetoresistor, at least one sensor element being aligned with a respective orthogonal axis for providing an accessory signal including a component for a respective orthogonal axis, each component being indicative of a magnetic field strength in the direction of the respective orthogonal axis;
wherein the controller is configured to receive the accessory signal and transform the components of the accessory signal to provide a transformed signal, the transformed signal including a component for a respective transformed sensor axis, each component being indicative of a magnetic field strength in the direction of the respective transformed sensor axis, and wherein the transformed sensor axes intersect at an expected position of the magnet when the accessory is used with the kitchen device;
wherein the controller is configured to determine, based on the transformed signal and calibration data, a distance of the magnet from the expected position; and
wherein the controller is configured to, when the distance of the magnet from the expected position is within a predetermined tolerance, operate the kitchen device.

2. The kitchen device of claim 1, wherein the controller operates the kitchen device according to a predetermined set of instructions or within a predetermined set of operational limitations, and
wherein the predetermined set of instructions and predetermined set of operational limitations are selected by the controller based on the accessory signal.

3. The kitchen device of claim 1, wherein the magnetoresistor includes a first sensor element being aligned with a first sensor axis that intersects the magnetoresistor,
wherein the accessory signal includes a first component for the first sensor axis, the first component being indicative of a magnetic field strength in the direction of the first sensor axis, and
wherein the controller is configured to interpret an accessory signal indicative of a magnetic field strength within a predetermined range in a predetermined direction as being indicative of a presence of the accessory.

4. The kitchen device of claim 3, wherein the magnetoresistor includes a second sensor element being aligned with a second sensor axis that intersects the magnetoresistor, the second sensor axis being non-parallel to the first sensor axis, and
wherein the accessory signal includes a second component for the second sensor axis, the second component being indicative of a magnetic field strength in the direction of the second sensor axis.

5. The kitchen device of claim 4, wherein the magnetoresistor includes a third sensor element being aligned with a third sensor axis that intersects the magnetoresistor, the third sensor axis being non-parallel to the first and second sensor axes, and
wherein the accessory signal includes a third component for the third sensor axis, the third component being indicative of a magnetic field strength in the direction of the second third axis.

6. The kitchen device of claim 5, wherein the first sensor axis is a radial axis indicating a distance from a reference point in a first plane, the second sensor axis is a circumferential axis in the first plane indicating an angle from a reference direction, and the third sensor axis is a second circumferential axis in a second plane indicating a second angle from a second reference direction.

7. The kitchen device of claim 5, wherein the first sensor axis is a radial axis indicating a distance from a reference point in a first plane, the second sensor axis is a circumferential axis in the first plane indicating an angle from a reference direction, and the third sensor axis is an axis indicating a distance from the reference point in a second plane,
wherein the second plane is normal to the first plane.

8. The kitchen device of claim 3, wherein the controller is configured to transpose the accessory signal to provide a transposed signal such that a magnitude of the accessory signal is substantially zero or close to zero by a margin of at most 10 times of a RMS noise level of the magnetoresistor when the accessory is coupled to the base.

9. The kitchen device of claim 1, wherein the accessory is a first accessory or a second accessory, the first and second accessory having a first and second magnet at a first and second magnet location, respectively, and
wherein the first and second magnet have different magnetic moments and/or the first and second magnet locations relative to the magnetoresistor are different when the accessory is received in the coupling such that the accessory signal provided by the magnetoresistive sensor when the first accessory is received by the coupling is different to the accessory signal provided by the magnetoresistor when the second accessory is received by the coupling.

10. The kitchen device of claim 1, wherein the coupling is for receiving an intermediate accessory, the intermediate accessory having a second coupling for receiving the accessory.

11. The kitchen device of claim 1, wherein the magnetometer has three or more sensor elements, at least one sensor element being aligned with a respective orthogonal axis for providing an accessory signal including a component for a respective orthogonal axis, each component being indicative of a magnetic field strength in the direction of the respective orthogonal axis; and
the controller is configured to transform the components of the accessory signal to provide a transformed signal, the transformed signal including a component for a respective transformed sensor axis, each component being indicative of a magnetic field strength in the direction of the respective transformed sensor axis, such that the transformed sensor axes intersect at an expected position of the magnet when the accessory is used with the kitchen device, the controller being further configured to determine a distance of the magnet from the expected position based on the transformed signal and calibration data, such that the controller operates the kitchen device in response to the distance of the magnet from the expected position being within a predetermined tolerance.

12. The kitchen device of claim 1, wherein the controller is configured to operate the kitchen device according to a predetermined set of instructions or within a predetermined set of operational limitations, the predetermined set of instructions and the set of predetermined set of operational limitations being selected by the controller based on the transformed signal.

13. A method for operating a combination of a kitchen device and an accessory, the kitchen device having:
a controller for operating the kitchen device; and
a magnetometer including three or more sensor elements, at least one sensor element being aligned with a respective orthogonal axis for providing an accessory signal including a component for a respective orthogonal axis, each component being indicative of a magnetic field strength in the direction of the respective orthogonal axis, the accessory having a magnet, the method including the steps of:
receiving, at the controller, the accessory signal;
transforming, at the controller, the components of the accessory signal to provide a transformed signal, the transformed signal including a component for a respective transformed sensor axis, each component being indicative of a magnetic field strength in the direction of the respective transformed sensor axis, and wherein the transformed sensor axes intersect at an expected position of the magnet when the accessory is used with the kitchen device;

determining, at the controller, based on the transformed signal and calibration data, a distance of the magnet from the expected position;

when the distance of the magnet from the expected position is within a predetermined tolerance, operating, using the controller, the kitchen device.

14. The method of claim 13, wherein the step of operating the kitchen device includes operating the kitchen device according to a predetermined set of instructions or within a predetermined set of operational limitations, wherein the predetermined set of instructions and the set of predetermined set of operational limitations are selected by the controller based on the transformed signal.

* * * * *